United States Patent
Hagino

(10) Patent No.: US 9,371,159 B2
(45) Date of Patent: Jun. 21, 2016

(54) PACKAGING CONTAINER AND METHOD FOR MANUFACTURING THE SAME

(71) Applicant: PACKS CO., LTD., Osaka-shi (JP)

(72) Inventor: Junichi Hagino, Osaka (JP)

(73) Assignee: PACKS CO., LTD., Osaka (JP)

( * ) Notice: Subject to any disclaimer, the term of this patent is extended or adjusted under 35 U.S.C. 154(b) by 0 days.

(21) Appl. No.: 14/484,839

(22) Filed: Sep. 12, 2014

(65) Prior Publication Data

US 2015/0078686 A1 Mar. 19, 2015

(30) Foreign Application Priority Data

Sep. 17, 2013 (JP) .................................. 2013-191728
Jul. 29, 2014 (JP) .................................. 2014-153760

(51) Int. Cl.
| | | |
|---|---|---|
| *B65D 33/01* | (2006.01) | |
| *B65D 30/08* | (2006.01) | |
| *B31B 3/74* | (2006.01) | |
| *B32B 7/06* | (2006.01) | |

(Continued)

(52) U.S. Cl.
CPC . *B65D 31/02* (2013.01); *B31B 3/74* (2013.01); *B32B 3/266* (2013.01); *B32B 7/06* (2013.01); *B65D 77/225* (2013.01); *B65D 81/34* (2013.01); *B65D 81/3415* (2013.01); *B65D 81/3461* (2013.01); *B32B 2439/40* (2013.01); *B32B 2439/70* (2013.01)

(58) Field of Classification Search
CPC ....................................................... B65D 33/01
USPC .................... 383/100–103; 426/395; 219/735
See application file for complete search history.

(56) References Cited

U.S. PATENT DOCUMENTS 6,182,850 B1 * 2/2001 Marbler ............... B65D 77/225
   220/359.3
6,596,355 B1 * 7/2003 Mita ....................... B32B 27/08
   428/346

(Continued)

FOREIGN PATENT DOCUMENTS

EP  0661219 A2  7/1995
EP  1122189 A1 *  8/2001  ............. B65D 75/26

(Continued)

OTHER PUBLICATIONS

Extended European Search Report issued Feb. 25, 2015 in corresponding EP Application No. 14184799.6.

(Continued)

*Primary Examiner* — Jes F Pascua
(74) *Attorney, Agent, or Firm* — Knobbe Martens Olson & Bear LLP

(57) ABSTRACT

To provide, with a simple construction, a packaging container by which leakage can be prevented, and breakage of the packaging container and flying-out of the contents accompanying the pressure rise in the inside of the container accompanying the warming can be prevented in warming the contents together with the container body.
An internal space 2 for storing contents F is formed by a laminate film 1. A circumferential end part of the laminate film 1 is subjected to a thermal fusion treatment to form a sealed portion 3 (3a to 3c). In laminate film 1, a first slit Sa having a predetermined length is formed so as to intersect a part of the sealed portion 3b. A second adhesive layer Lb is disposed in a region having a predetermined width in a neighborhood of the first slit Sa.

17 Claims, 6 Drawing Sheets

(51) Int. Cl.
*B32B 3/26* (2006.01)
*B65D 77/22* (2006.01)
*B65D 81/34* (2006.01)

(56) References Cited

U.S. PATENT DOCUMENTS

| | | | |
|---|---|---|---|
| 8,931,955 B2 * | 1/2015 | Peplinski | B32B 7/02 383/101 |
| 2009/0029082 A1 | 1/2009 | Remmele et al. | |
| 2009/0117323 A1 | 5/2009 | Lin | |
| 2009/0257687 A1 * | 10/2009 | Mitchell | B65D 81/3461 383/103 |
| 2011/0248036 A1 | 10/2011 | Peplinski | |

FOREIGN PATENT DOCUMENTS

| | | |
|---|---|---|
| JP | H09-240746 A | 9/1997 |
| JP | 11310278 A * | 11/1999 |
| JP | 2000-313480 A | 11/2000 |

OTHER PUBLICATIONS

Office Action mailed Dec. 7, 2015 in corresponding Taiwanese Patent Application No. 103131882.
Office Action issued Feb. 2, 2016 in corresponding KR Application No. 10-2014-0121727.

* cited by examiner (A)

(B)

(C)

(D)

(A)

(B)

PACKAGING CONTAINER AND METHOD FOR MANUFACTURING THE SAME

BACKGROUND OF THE INVENTION

1. Field of the Invention

The present invention relates to a packaging container and a method for manufacturing the same. More particularly, the present invention relates to a packaging container capable of heating or warming the contents thereof and a method for manufacturing the same.

2. Description of the Related Art

Packaging containers made of a tightly sealable resin film are often used as a container for packaging foods, a container for storing various small articles, and the like. These packaging containers have a high air-tight property and are hygienic due to sterilization by being pressurized and heated, so that the contents in the container can be preserved for a long period of time. Moreover, at using, the contents can be warmed by immersion into hot water, use of a microwave oven, or the like in a state in which the contents are stored in the packaging container. In the case in which the contents are constituted of foods, cooking of the foods can also be carried out easily.

Typically, such a packaging container may be one in which a laminate film having a resin such as vinylidene chloride excellent in shielding against oxygen interposed therein, for example, is thermally fused to an opening part of an upper plane of the container body that stores the contents, so as to enclose the contents (for example, see Japanese Patent Application Laid-Open (JP-A) No. 2000-34448). In this case, when a packaging container having such a tightness property is warmed, the packaging container may be exploded to let the contents fly out, so that the packaging containers are perforated at several sites thereof in advance by using a fork or the like before warming. Also, the warming is often carried out several times. A process is often carried out in which, after the top seal (easily openable sealed part) of the packaging container is peeled off and the contents are stirred, the packaging container is covered with a cover film and warmed, and thereafter the contents in the packaging container are stirred and warmed again. In this case, it requires a cumbersome work of perforating the packaging container and further a stirring work, and moreover, the contents may fly out from the holes depending on the way of forming the holes, so that it has not been preferable.

Also, in order that the perforating work may not be needed, a packaging container is used in which the contents are warmed after the seal of the container is partly peeled off before warming. This packaging container is subjected to an easy-opening treatment in advance so that a specific site of the seal may be easily peeled off. Such an easy-opening treatment may be a method in which a slit is formed in advance at one end of the laminate film thermally fused to the container body, and the container is tightly closed with a special ink serving also as an adhesive agent. However, this method may be disadvantageous in that, when the contents stored in the container body are liquid substances or gas-substituted packaged substances, the contents may leak out from the slit during the transportation to consumer markets. Moreover, because the easy-opening treatment is required, there is a problem of rise in the production costs of the container itself.

Therefore, an object of the present invention is to provide, with a simple construction, a packaging container by which leakage can be prevented with certainty even when the contents stored in the packaging container are liquid substances or gas-substituted packaged substances, and moreover, breakage of the packaging container and flying-out of the contents accompanying the pressure rise in the inside of the container accompanying the warming can be prevented in warming the contents together with the container body, as well as a method for manufacturing the same.

SUMMARY OF THE INVENTION

As a result of repeated eager researches in order to solve the aforementioned problems, the present inventor has found out that the aforementioned object can be achieved by a packaging container and a method for manufacturing the same that are shown below, thereby completing the present invention.

The present invention is a packaging container having a laminate film formed by laminating a plurality of thin-layer films, so as to form an internal space for storing contents, in which at least a part of a circumferential end part of the laminate film is subjected to a thermal fusion treatment to form a sealed portion, wherein the laminate film is formed of at least two or more thin-layer films comprising a first inner layer that is in contact with the internal space and a second inner layer that is in contact with an outer side surface of the first inner layer, and has a first adhesive layer having a first adhesive agent applied thereon and disposed between the first inner layer and the second inner layer;

a first slit having a predetermined length is formed in the first inner layer so as to intersect a part of a fused portion of the circumferential end part subjected to the thermal fusion treatment, and a second adhesive layer having a second adhesive agent, which has a lower melting temperature than the first adhesive agent, applied thereon instead of the first adhesive agent is disposed in a region having a predetermined width in a neighborhood of the first slit; and, in a state in which the internal space is subjected to warming and an internal pressure thereof is raised, the second adhesive layer is melted by the warming and/or by a warmed vapor to generate a space part between the first inner layer and the second inner layer in the neighborhood of the first slit and to form an opening by the first slit.

With such a construction, the circumferential end part of the plurality of thin-layer films laminated via the first and second adhesive layers are thermally fused to form a firm seal having a high strength with a simple construction in which the packaging container is used in a non-warming state. Also, even when the contents stored in the packaging container are liquid substances or gas-substituted packaged substances, leakage can be prevented with certainty. Further, in a state of pressure rise in the inside of the container accompanying the warming, breakage of the packaging container and flying-out of the contents can be prevented by forming of the release of the internal pressure from a part of the fused portion at the circumferential end part of the container by the opening formed in the second adhesive layer in the neighborhood of the first slit having a lower melting temperature. In this manner, a packaging container can be provided in which a firm seal having a high strength is formed with a simple construction, and moreover, breakage of the packaging container and flying-out of the contents accompanying the pressure rise in the inside of the container accompanying the warming can be prevented. Here, the present invention recites that the internal space is formed by the laminate film; however, the present invention also comprises a construction in which the internal space is formed by constituent elements other than the laminate film, for example, by combination with a later-mentioned container body.

The present invention is also the packaging container described above, wherein a part of the plurality of thin-layer films comprises a non-gas-permeable film, and an inert gas or a gas predetermined by the contents is tightly sealed in the internal space together with the contents under pressurized conditions.

In a conventional packaging container, when a sealing property in a non-warming state is ensured, rapid release of the internal pressure is invited at warming. Conversely, when slow leakage of the internal pressure at warming is ensured, decrease in the internal pressure or mingling of outside air in a long-term storage is inevitable even when the inside of the container is pressurized in a non-warming state. Therefore, there has not been a packaging container provided with both of these functions. As described above, in the packaging container according to the present invention, the first slit is provided in a part of the laminate film in order to suppress an excessive pressure rise of the internal space at warming, and the adhesive layers are provided over the whole surface between the first inner layer and the second inner layer comprising the first slit part. Therefore, breakage of the packaging container and flying-out of the contents can be prevented by the slow leakage of the internal pressure at warming, and also an extremely firm seal can be formed in a non-warming state. On the other hand, in the case in which the contents comprise fresh foods or the like, it is often preferable that the atmosphere of the internal space is an inert gas atmosphere in order to maintain the freshness thereof. Also, there are cases in which it is preferable to provide a predetermined gas atmosphere during a period of time after tight sealing is carried out and until the contents are warmed and taken out, such as a case in which the contents comprise a fruit. In the packaging container according to the present invention, by using the inherent sealing property thereof, an inert gas or a predetermined gas is enclosed and tightly sealed in the internal space, into which the contents have been introduced, under conditions pressurized to have a higher pressure than outside air, whereby an atmosphere suitable for the contents can be ensured, and also breakage of the packaging container and flying-out of the contents can be prevented by the slow leakage of the internal pressure at warming.

The present invention is also the packaging container described above, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form a seal in the packaging container so as to form the internal space.

In a container for packaging foods, for example, there is a case in which heating or the like is carried out in a state in which the contents are stored in the packaging container in addition to a case in which the contents are taken out to a different container at cooking. In particular, at warming the contents using a microwave oven, stability in placing the packaging container and the shape-retaining property are required. The present invention ensures such functions by using a container body having an opening part and provided with the flange part in the opening part and in the outer circumference thereof and the laminate film such as described above as the packaging container. Also, with a simple construction, leakage of the contents stored in the packaging container can be prevented with certainty, and moreover, breakage of the packaging container and flying-out of the contents accompanying the pressure rise in the inside of the container accompanying the warming can be prevented in warming the contents together with the container body.

The present invention is also the packaging container described above, wherein a first outer circumferential portion having the second adhesive layer is formed at a site located on a further outer circumferential side of the fused portion of the circumferential end part and on an outer circumferential side of one end of the first slit; and, in a state in which the internal space is subjected to warming and an internal pressure thereof is raised, the second adhesive layer in the neighborhood of the first slit is melted by the warming and/or by a warmed vapor to generate a space part between the first inner layer and the second inner layer so as to form an opening in the first slit and in the first outer circumferential portion, and the laminate film can be peeled off from the opening formed in the first slit and in the first outer circumferential portion, whereby the contents can be taken out from the internal space.

With such a construction, an opening linked to the inside of the container for taking the contents out can be obtained without disposing a fractured part or an exclusive-use outlet in the thin-layer film that is needed in taking the contents out from the packaging container. The contents can be taken out from the packaging container using the opening.

The present invention is also the packaging container described above, wherein one or more slits continuously or intermittently connected to the first slit are formed in the first internal layer; each of the slits is formed to have a shape of a straight line or a curved line or are formed intermittently in plural to be perpendicular to or to have a predetermined angle to the straight line or the curved line; and the second adhesive layer is disposed in a region having a predetermined width of a neighborhood of the slits.

As described above, the first slit and the second adhesive layer in the present invention perform important functions at the time of pressure rise in the inside of the container. On the other hand, various structures and shapes are applied to the packaging container depending on the shape and property of the contents (for example, being a liquid substance or need of a deoxygenation treatment) or a handling method. The present invention can be applied to various packaging containers such as these to ensure the functions described above by forming one or more slits having a predetermined construction comprising the first slit.

The present invention is also a method for manufacturing a packaging container having a laminate film formed by laminating a plurality of thin-layer films, so as to form an internal space for storing contents, in which at least a part of a circumferential end part of the laminate film is subjected to a thermal fusion treatment to form a sealed portion, comprising the steps of:

(1) supplying at least two or more thin-layer films comprising a first inner layer film that is in contact with the internal space and a second inner layer film that is in contact with an outer side surface of the first inner layer film respectively from source rolls of the films;

(2) forming one or more slits, which comprise the first slit and are continuously or intermittently connected to the first slit, in the first inner layer film;

(3) applying a first adhesive agent, which maintains an adhesive property under temperature and pressure conditions at using the packaging container, to a first region between the first inner layer film and the second inner layer film, so as to form a first adhesive layer;

(4) applying a second adhesive agent, which has a lower melting temperature than the first adhesive agent, to a second region having a predetermined width and a predetermined length, excluding the first region, in a neighborhood of the slits comprising at least the first slit, so as to form a second adhesive layer;

(5) bonding at least the first inner layer film, the second inner layer film, the first adhesive layer, and the second adhesive layer, so as to produce the laminate film;

(6) shaping the laminate film in order that the laminate film has a predetermined shape constituting the packaging container and in order that the first slit intersects a part of a fused portion formed in the circumferential end part of the laminate film, and further comprising the steps of:

(7a) forming a sealed portion by performing a thermal fusion treatment on the circumferential end part of the laminate film so as to form the internal space while leaving an inlet portion for introducing the contents; and (8a) introducing the contents from the inlet portion into the internal space and performing a thermal fusion treatment on the inlet portion to form a seal of the packaging container, or alternatively further comprising the steps of:

(7b) introducing the contents into the internal space formed by the laminate film; and (8b) forming a seal of the packaging container by performing a thermal fusion treatment on the circumferential end part of the laminate film.

As described above, the packaging container according to the present invention can prevent leakage of the stored contents with certainty with a simple construction and further can prevent breakage of the packaging container and flying-out of the contents accompanying the pressure rise in the inside of the container accompanying the warming. Also, such a simple construction has made it possible to manufacture a packaging container such as described above without performing complicated steps. Specifically, by supplying the plurality of thin-layer films from the source rolls and performing slit processing and forming the second adhesive layer in the first inner layer film, a method for manufacturing a packaging container having excellent functions such as described above can be provided by simple steps of shaping the laminate film, forming the internal space, introducing the contents, and sealing the internal space by thermal fusion that are performed later. At this time, the seal can be formed either before or after introducing the contents into the internal space depending on the property or the like of the contents. By introducing the contents into the internal space after a part of the seal is formed in advance, a treatment of reducing the pressure in the internal space can be easily carried out. By forming the seal after the contents are introduced into the internal space, the seal can be formed by an integral thermal fusion treatment.

The present invention is also the method for manufacturing the packaging container described above, comprising, instead of the step (8a), the steps of:

(8c) introducing the contents from the inlet portion into the internal space and tightly sealing an inert gas or a gas predetermined by the contents under pressurized conditions; and (8d) performing a thermal fusion treatment on the inlet portion to form a seal of the packaging container, or alternatively comprising, instead of the step (8b), the steps of:

(8e) tightly sealing an inert gas or a gas predetermined by the contents under pressurized conditions; and (8f) forming a seal of the packaging container by performing a thermal fusion treatment on the circumferential end part of the laminate film.

With such a construction, the internal space filled with the contents can be made to be an atmosphere suitable for the contents. Specifically, an inert gas as described later or a gas that accords to the inherent characteristics of the contents is enclosed.

The present invention is also the method for manufacturing the packaging container described above, comprising, instead of the steps (2) to (4), the steps of:

(2a) continuously or intermittently forming the slits comprising the first slit parallel to a direction of supplying the first inner layer film from the source roll; and (3a) simultaneously performing application of the first adhesive agent to the first region and application of the second adhesive agent to the second region so as to form the first adhesive layer and the second adhesive layer simultaneously.

With such a construction, the step of forming the slits comprising the first slit and the step of forming the adhesive layers can be carried out easily and quickly, whereby a high processing precision can be ensured.

The present invention is also the method for manufacturing the packaging container described above, comprising, instead of the steps (2) to (5), the steps of:

(2b) forming the first adhesive layer in the same manner as in the step (3);

(3b) forming the second adhesive layer in the same manner as in the step (4);

(4b) forming the laminate film in the same manner as in the step (5);

(5b) forming one or more slits, which comprise the first slit and are continuously or intermittently connected to the first slit, by performing laser processing on the first inner layer film on which the second adhesive layer has been formed.

The slits comprising the first slit can be formed by cutting to a depth corresponding to the thickness of the first inner layer film constituting one surface layer of the produced laminate film. On the other hand, when the slits are formed in advance in the first inner layer film, assemblage of the packaging container may become complicated. Also, when the slits do not have a simple shape such as a straight line, it may be preferable to perform processing on the first inner layer from the surface of the produced laminate film rather than to form the slits in advance in the first inner layer film. The present invention makes it possible to form slits having a desired slit shape or slit width by processing using a laser processing technique capable of precise processing of a distance corresponding to several to several ten □m until reaching the second adhesive layer in a depth direction on the first inner layer of the produced laminate film.

The present invention is also the method for manufacturing the packaging container described above, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form the sealed portion in the step (7a) and the seal in the step (8a) or (8d), or alternatively the seal in the step (8b) or (8f).

With such a construction, a method for manufacturing a packaging container ensuring the functions required in the packaging container such as the stability in placing and the shape-retaining property can be provided.

DETAILED DESCRIPTION OF THE PREFERRED EMBODIMENTS

In a packaging container according to the present invention (hereafter referred to as "present container"), a laminate film formed by laminating a plurality of thin-layer films forms an internal space for storing contents, and at least a part of a circumferential end part of the laminate film is subjected to a thermal fusion treatment to form a sealed portion. At this time, a construction in which the internal space is formed by a combination of the laminate film with other constituent elements such as a container body having a shape-retaining property is also comprised. Further, the laminate film is formed of at least two or more thin-layer films comprising a first inner layer that is in contact with the internal space and a second inner layer that is in contact with an outer side surface of the first inner layer, and has a first adhesive layer having a first adhesive agent applied thereon and disposed between the first inner layer and the second inner layer. A first slit having a predetermined length is formed in the first inner layer so as to intersect a part of a fused portion of the circumferential end part subjected to the thermal fusion treatment, and a second adhesive layer having a second adhesive agent, which has a lower melting temperature than the first adhesive agent, applied thereon instead of the first adhesive agent is disposed in a region having a predetermined width in a neighborhood of the first slit. With a simple construction, a firm seal having a high strength is formed, and also breakage of the packaging container and flying-out of the contents accompanying a pressure rise in the inside of the container accompanying warming can be prevented. Hereafter, embodiments of the present invention will be described with reference to the attached drawings.

<Basic Construction Example of Packaging Container According to the Present Invention>

Figure 1:
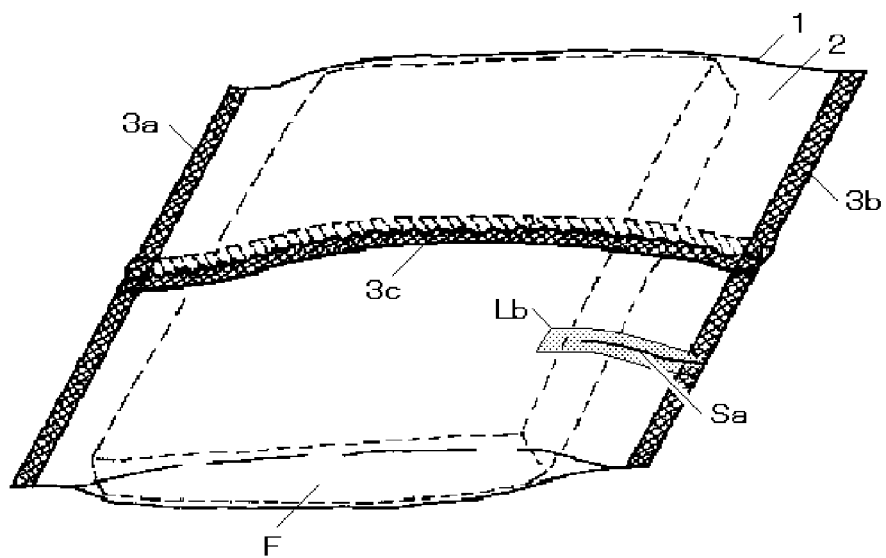
FIG. 1 is a schematic view exemplifying a basic construction of a packaging container according to the present invention.

FIG. 1 is a schematic view illustrating a basic construction example (first construction example) of the present container. In the present container, an internal space 2 for storing contents F is formed by a laminate film 1. A circumferential end part of the laminate film 1 is subjected to a thermal fusion treatment to form a sealed portion 3 (3a to 3c). The laminate film 1 is formed of at least a first inner layer film and a second inner layer film (which will be described later). A first slit Sa (shown by a solid line in FIG. 1) having a predetermined length is formed in the first inner layer film (first inner layer) that is in contact with the inner space 2, so as to intersect a part of the sealed portion 3b. A second adhesive layer Lb is disposed in a region (second region) having a predetermined width in a neighborhood of the first slit Sa. Here, an example is shown in which one sheet of the laminate film 1 is bent and folded, and a circumferential end part thereof is thermally fused, whereby the internal space 2 is formed by the three sealed portions 3a to 3c constituting the sealed portion 3. A whole of the sealed portions 3a to 3c may be subjected to the thermal fusion treatment thereby to ensure a firm seal; however, a construction may be adopted in which a part thereof is thermally fused and the other part is subjected to a different sealing treatment such as an adhesive treatment. Here, the arrangement of the sealed portions 3a to 3c is not particularly limited as long as the internal space 2 having a desired inner volume can be formed. Also, the present container may comprise a construction in which a plurality of laminate films 1 are used, and the thermal fusion treatment is performed at more than three sites to form the sealed portion 3.

Figure 2:
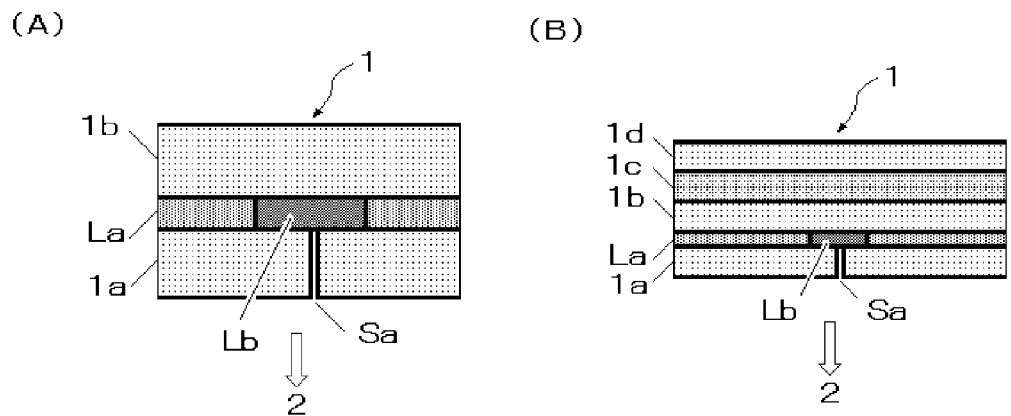
FIG. 2 is a schematic view exemplifying embodiments of a laminate film according to the present invention.

As exemplified in FIG. 2, the laminate film 1 is formed of two or more thin-layer films comprising at least a first inner layer film (first inner layer 1a) and a second inner layer film (second inner layer 1b). Examples of materials suitable for the thermal fusion treatment comprise polypropylene film, polyethylene film, and polyethylene terephthalate (PET) film. FIG. 2(A) exemplifies the laminate film 1 comprising the first inner layer 1a and the second inner layer 1b that are bonded by the first adhesive layer La and the second adhesive layer Lb. The first inner layer 1a is in contact with the internal space 2, and the second inner layer 1b is in contact with an outer side surface of the first inner layer 1a. Hereafter, description will be given on a construction made of the first inner layer 1a and the second inner layer 1b as a basic laminate film 1; however, referring to FIG. 2(B), a laminate film formed by laminating plural kinds of thin-layer films 1c, 1d, . . . 1n as outer layers of the second inner layer 1b is used in the present container. It is preferable that some of the thin-layer films 1a to 1n are thin-layer films having various functions (functional films) such as a shielding layer having a high property of shielding against oxygen or a light-resistant layer having a high property of shielding against light for protection of the contents. As a functional film, for example, a polystyrene film or the like having a good printing property may be used as the outermost layer. Also, when the contents are retort pouch foods or the like, a material such as a polyethylene film or a PET film that can be cooked in a microwave oven may be used. In any case, it is required that the films are made of materials that can form a seal having a predetermined pressure-resistant property by the thermal fusion treatment. Also, the film having a high property of shielding against oxygen may be, for example, a vinylidene chloride film or the like; the film having a high property of shielding against light may be, for example, an aluminum laminate film or the like; and the film having a good printing property may be, for example, a nylon film, a PET film, a biaxially oriented polypropylene (OPP) film, or the like. As the laminate film 1, it is preferable to construct a multifunctional film obtained by combination of such materials as these depending on the purpose of use.

The first slit Sa having a predetermined length such as shown in FIG. 1 is formed in the first inner layer 1a constituting the laminate film 1. The first slit Sa is disposed to intersect a part of the fused portion (sealed parts 3a to 3c) of the circumferential end part of the laminate film 1 (sealed part 3b in the present construction example) in the produced packaging container. Also, referring to FIG. 2(A), the first adhesive layer La having a first adhesive agent applied thereon and the second adhesive layer Lb having a second adhesive agent, which has a lower melting temperature than the first adhesive agent, applied thereon are disposed between the first inner layer 1a and the second inner layer 1b. The second adhesive layer Lb is disposed in a region (second region) having a predetermined width in a neighborhood of the first slit Sa. In a state in which non-warming is carried out, a firm seal having a high strength is formed with a simple construction by the plurality of thin-layer films laminated via the first and second adhesive layers and by the thermally fused circumferential end part thereof. In a state of pressure rise in the inside of the container accompanying the warming, release of the internal pressure from a part of the fused portion at the circumferential end part of the container is formed by the opening formed in the second adhesive layer, having a lower melting temperature, in the neighborhood of the first slit.

Figure 3:
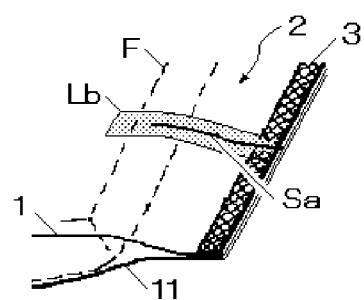
FIG. 3 is a reference view describing functions of a first slit and a second adhesive layer in a warmed state.
Figure 3:
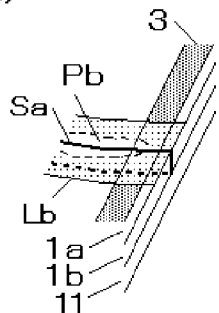
Figure 3:
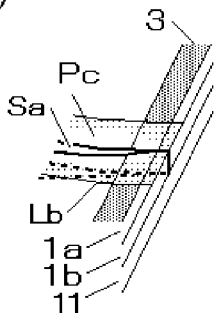
Figure 3:
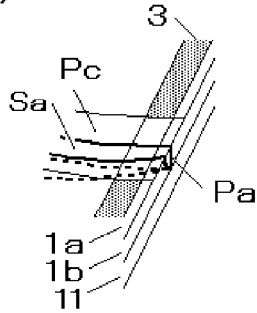

The functions performed by the first slit Sa and the second adhesive layer Lb when the present container is warmed are exemplified in FIG. 3. FIG. 3(A) shows a case in which the first slit Sa and the second adhesive layer Lb are disposed in the thermally fused sealed part 3 in a state in which the circumferential ends of the laminate films 1 and 11 are raftered. Here, for example, in the case of warming retort pouch foods with a microwave oven or the like, the contents are warmed to about 60 to 120° C. In accordance with the warming of the internal space 2, the internal pressure rises. In this state, by the warming and/or by a warmed vapor via the first slit Sa disposed in the laminate film 1, the second adhesive agent applied on the second adhesive layer Lb in the neighborhood of the first slit Sa is melted (Pb) as shown in FIG. 3(B). The melted part Pb gradually enlarges and, as shown in FIG. 3(C), a space part Pc is generated in the second adhesive layer Lb by the pressing accompanying the pressure rise of the internal space 2, and also widening is generated in the width direction in the first slit Sa. The space part Pc gradually enlarges to the region that intersects the sealed part 3, and an opening Pa from the internal space 2 to the outside is formed via the first slit Sa and the second adhesive layer Lb, as shown in FIG. 3(D). By discharge of a part of the gas component (vapor) in the inside of the container through the opening Pa, the pressure rise in the internal space 2 is suppressed, whereby breakage of the contents F and the packaging container can be prevented.

The first adhesive agent applied on the first adhesive layer La may be, for example, one of edible pressure-sensitive adhesive agents such as various cereal starches, various polysaccharides derived from natural substances such as galactomannan, proteins such as corn protein, albumin, and gelatin, natural gummous substances, shellac, glycerin, and mixtures obtained by suitably blending these. These can be applied, for example, after being diluted with denatured alcohol. The second adhesive agent applied on the second adhesive layer Lb is an adhesive agent (ink) having a lower melting temperature than the first adhesive agent so that the second adhesive agent may be melted earlier than the first adhesive agent when the internal space 2 is warmed. Specifically, for example, cellulose-based ink or resealable type ink can be used. An ink containing methylcellulose as a major component can be applied as an aqueous solution.

In the present container, it is preferable that a part of the thin-layer films 1a to 1n comprises a non-gas-permeable film, and an inert gas or a gas predetermined by the contents F (herein referred to as "enclosed gas") is tightly sealed in the internal space 2 together with the contents F under pressurized conditions. For example, in the case in which the contents F are fresh foods or the like, deterioration, denaturing, or the like caused by oxidation of the foods can be prevented when the atmosphere of the internal space 2 is an inert gas (for example, nitrogen, carbon dioxide, or the like) in order to maintain the freshness thereof. In particular, with respect to containers made for the purpose of long-term storage such as for frozen foods, a non-oxidation technique is useful as well as a freezing technique. Also, the enclosed gas is not limited to an inert gas alone. There are cases in which a predetermined gas atmosphere is suitable during the period of time after the tight sealing is carried out until the contents are warmed and taken out, such as a case in which the contents F are fruits. For example, it is known in the art that, with respect to water-containing cereals such as porridge, the flavor thereof can be maintained by the presence of a predetermined amount of oxygen (for example, see Japanese Patent No. 2986243). In such a case, a packaging container can be produced by which a fresh flavor obtained at opening can be tasted even after long-term storage by allowing the atmosphere of the internal space 2 into which the contents F (for example, porridge or the like) have been introduced to be a nitrogen gas atmosphere containing a slight amount of oxygen. Also, it is known in the art that, with respect to fruits such as bananas, apples, and kiwi fruits, the degree of maturation can be raised by an ethylene atmosphere. By introducing, for example, a predetermined concentration of ethylene into a container for enclosing processed foods comprising such fruits, an effect of maintaining or increasing the sweetness of the fruits can be obtained.

In the present container, the adhesive layers are provided over the whole surface between the first inner layer 1a and the second inner layer 1b, whereby an extremely firm seal is formed. Therefore, in a non-warmed state, the enclosed gas can be sealed in a stable pressurized state even for a long period of time. Specifically, in the above first construction example, a pressure resistance test was carried out on the present container in which a second adhesive layer Lb having a width of about 8 mm had been disposed by using cereal starch as the first adhesive agent and cellulose-based ink as the second adhesive agent, giving a verification result that the present container has a pressure resistance property with a gas pressure of 2.5 kg/m$^2$ or more. On the other hand, the opening Pa from a part of the melted part Pb is ensured by the first slit Sa disposed between the first inner layer 1a and the second inner layer 1b and the second adhesive layer Lb located in a neighborhood thereof and having a lower melting temperature. Therefore, at warming, breakage of the packaging container and flying-out of the contents F can be prevented by the release (slow leakage) of the internal pressure. In other words, an inert gas or a free gas predetermined by the contents F can be enclosed by the present container having both of the contradictory functions that could not have been conventionally achieved, that is, firm sealing property capable of maintaining the pressurized sealed state at non-warming and release of the internal pressure at warming.

Figure 4:
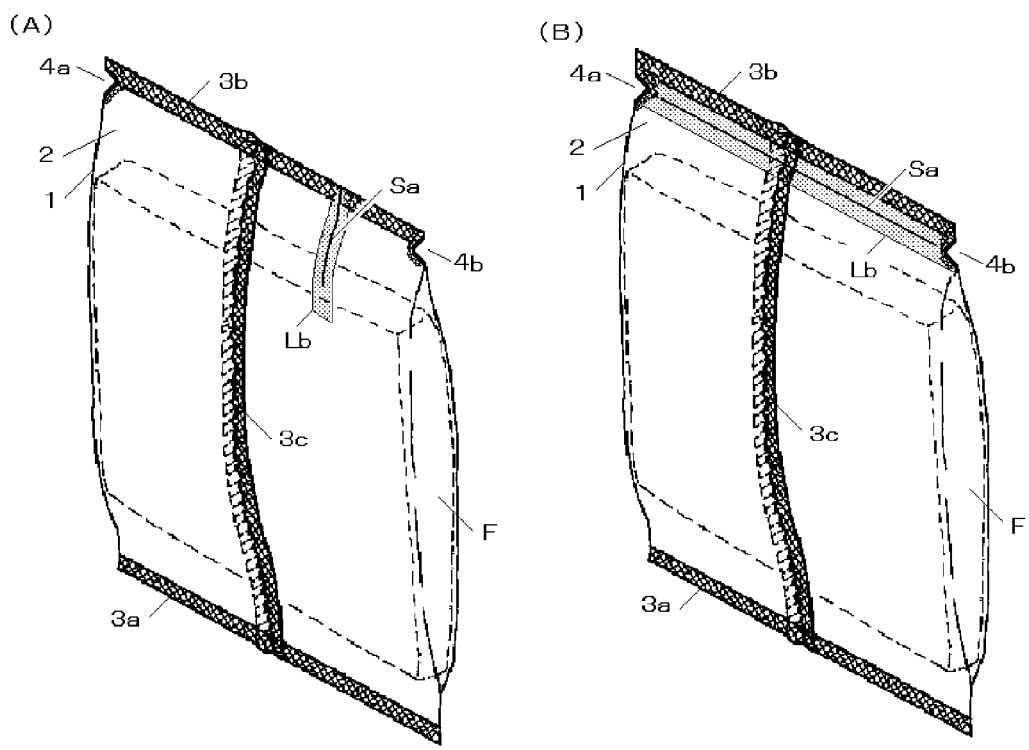
FIG. 4 is a reference view describing an opening function of the packaging container according to the present invention.

In the present container, cut-out portions 4a, 4b are provided at the ends of the sealed part 3b so as to facilitate opening of the packaging container, as exemplified in FIG. 4(A). By opening in a direction from the cut-out portion 4a (or 4b) to the cut-out portion 4b (or 4a), the contents F can be taken out from the warmed internal space 2. At this time, by disposing the cut-out portions 4a, 4b at positions of the sealed part 3b that go along the end surface (on the line connecting 4a-4b) of the internal space 2, the packaging container can be opened easily. Further, by using a laminate film 1 (for example, a monoaxially oriented film or the like) having a cutting property (property that allows easy fracture or tearing in a specific direction) and disposing the cut-out portions 4a, 4b in a direction that facilitates the tearing, the packaging container can be opened further more easily. Furthermore, as exemplified in FIG. 4(B), by disposing the first slit Sa and the second adhesive layer Lb on the line connecting 4a-4b where the cut-out portions 4a, 4b are disposed, the packaging container can be opened easily by using a cut part of the first slit Sa and the opening generated in the second adhesive layer Lb at warming.

(Second Construction Example of the Present Container)

Figure 5:
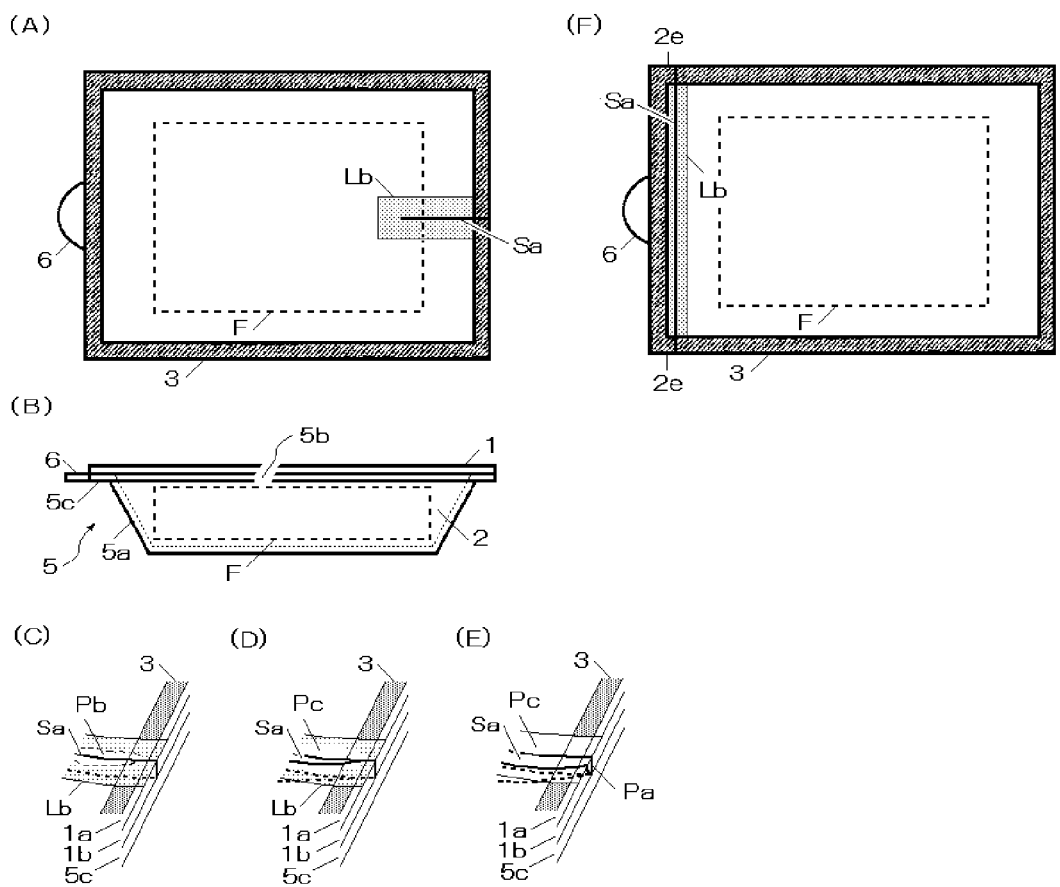
FIG. 5 is a schematic view illustrating a second construction example of a packaging container according to the present invention.

FIG. 5 is a schematic view illustrating a second construction example of the present container. In the present container, the internal space 2 is formed by combining the laminate film 1 in the first construction example with a container body 5 having a shape-retaining property. It is so constructed that the present container has the container body 5 having a recess 5a that is shaped to be capable of storing the contents F, a planar opening part 5b that is shaped at one end plane, and a flange part 5c having a predetermined width that is formed on an outer circumference of the opening part 5b, and has the laminate film 1 disposed to cover the opening part 5b. The circumferential end part of the laminate film 1 is thermally fused to the flange part 5c to form a seal by a sealed part 3 so as to form the internal space 2. In the laminate film 1, a first slit Sa having a predetermined length is formed to intersect a part of the sealed part 3, and a second adhesive layer Lb is provided in a region (second region) having a predetermined width in a neighborhood of the first slit Sa. A firm seal having a high strength is formed with a simple construction while ensuring the functions required in the packaging container such as the stability in placing and the shape-retaining property. Moreover, breakage of the packaging container and flying-out of the contents F accompanying the pressure rise in the inside of the container accompanying the warming can be prevented.

The container body 5 is made of a resin such as polypropylene and is manufactured by the blow molding method or the like. However, the method of molding the container body 5 is not particularly limited. The container body 5 has the recess 5a that can store the contents F and the internal space 2 is formed by the laminate film 1 so as to enclose the contents F in a tightly sealed state. At this time, it is preferable that the container body 5 has the flange part 5c that can form a seal between the container body 5 and the laminate film 1. Here, an example of a container has been given in which the container body 5 has the flange part 5c in the surroundings of the opening part 5b, and a part of the recess 5a has a prismatic shape; however, the shape is not limited to this alone. Any shape of the container capable of forming the sealed part 3 by performing a thermal fusion treatment on the circumferential end part of the laminate film 1 can be applied, such as a container in which the recess 5a has a rectangular parallelepiped (comprising a cube) shape, a part of a conical shape, a combination of these, or an arbitrary curved shape, or a container in which the sealed part 3 can be formed by performing a thermal fusion treatment on the circumferential end part of the laminate film 1 and a part of the recess 5a instead of the flange part 5c.

The functions performed by the first slit Sa and the second adhesive layer Lb when the present container is warmed are exemplified in FIG. 5(C) to 5(E). In accordance with the warming of the internal space 2, the internal pressure rises while the container body 5 is kept being little deformed. In this state, the second adhesive agent applied on the second adhesive layer Lb in the neighborhood of the first slit Sa is melted by the warming and/or by a warmed vapor via the first slit Sa, as shown in FIG. 5(C). The melted part Pb gradually enlarges and, as shown in FIG. 5(D), a space part Pc is generated in the second adhesive layer Lb by the pressing accompanying the pressure rise of the internal space 2, and also widening is generated in the width direction in the first slit Sa. The space part Pc gradually enlarges to the region that intersects the sealed part 3, and an opening Pa from the internal space 2 to the outside is formed via the first slit Sa and the second adhesive layer Lb, as shown in FIG. 5(E).

In order to facilitate opening of the present container, a part of the flange part 5c is preferably provided with an openable part 6 by which the laminate film 1 can be cut and torn or the sealed part 3 can be fractured. By crushing, for example, the openable part 6 upward or downward and peeling the laminate film 1 off from the flange part 5c to fracture the sealed part 3, a part of the opening part 5b is opened, and the contents F can be taken out from the warmed internal space 2. At this time, the packaging container can be opened easily by disposing the first slit Sa and the second adhesive layer Lb close to the openable part 6 and to be parallel to a part of the sealed part 3 that goes along the end surface 2e-2e of the internal space 2, as exemplified in FIG. 5(F). The packaging container can be opened easily by using a cut part of the first slit Sa and the opening Pa generated in the second adhesive layer Lb at warming.

(Third Construction Example of the Present Container)

Figure 6:
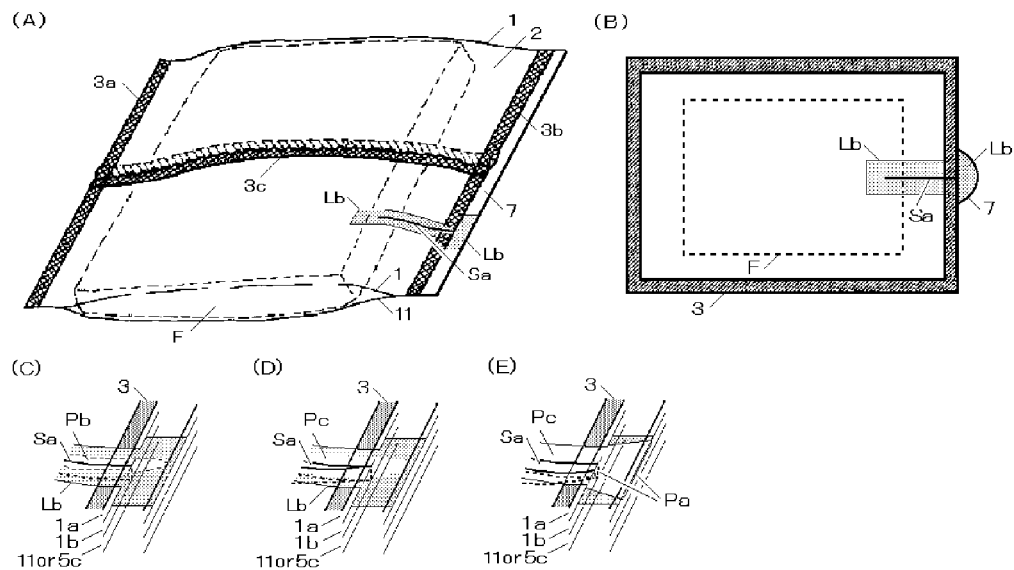
FIG. 6 is a schematic view illustrating a third construction example of a packaging container according to the present invention.

FIG. 6 is a schematic view illustrating a third construction example of the present container. FIG. 6(A) illustrates an embodiment in the first construction example of the present container. FIG. 6(B) illustrates an embodiment in the second construction example of the present container. In the present container, a first outer circumferential portion 7 having the second adhesive layer Lb is formed at a site located on a further outer circumferential side of the sealed part 3 and on the outside of the first slit Sa. The functions performed by the first slit Sa and the second adhesive layer Lb when the present container is warmed are exemplified in FIG. 6(C) to 6(E). In accordance with the warming of the internal space 2, the internal pressure rises. In this state, the second adhesive agent applied on the second adhesive layer Lb in the neighborhood of the first slit Sa is melted by the warming and/or by a warmed vapor via the first slit Sa, as shown in FIG. 6(C). The melted part Pb gradually enlarges, and the second adhesive agent applied on the second adhesive layer Lb located in the first outer circumferential portion 7 is melted. In accordance with the melting of the second adhesive layer Lb, a space part Pc is generated in the second adhesive layer Lb by the pressing accompanying the pressure rise of the internal space 2, as shown in FIG. 6(D), and also widening is generated in the width direction in the first slit Sa. The space part Pc gradually enlarges to the region that intersects the sealed part 3 and to the second adhesive layer Lb located in the first outer circumferential portion 7. In accordance with the generation of the space part Pc, an opening Pa from the internal space 2 to the fused portion—first outer circumferential portion 7—outside is formed via the first slit Sa and the second adhesive layer Lb, as shown in FIG. 6(E).

Here, by peeling the laminate film 1 off from the first slit Sa and the opening Pa to open the internal space 2, the contents F can be taken out. Specifically, when the opening Pa is formed in the second adhesive layer Lb located at the first slit Sa—fused portion—first outer circumferential portion 7, the part of the second inner layer 1b that is in contact with the second adhesive layer Lb comes into a state of being spaced apart from the first inner layer 1a in the opening Pa. By peeling the second inner layer 1b at the ends of the opening Pa of the first outer circumferential portion 7 (or together with the outer layers 1c, 1d, ... comprising this) from the first inner layer 1a, the opening Pa formed in the first outer circumferential portion 7—fused portion—first slit Sa can be enlarged. By enlarging the opening Pa formed in the first slit Sa so that the contents F can be taken out, the contents F can be taken out from the internal space 2 of the packaging container without disposing a fractured part or an exclusive-use outlet.

(Fourth Construction Example of the Present Container)

Figure 7:
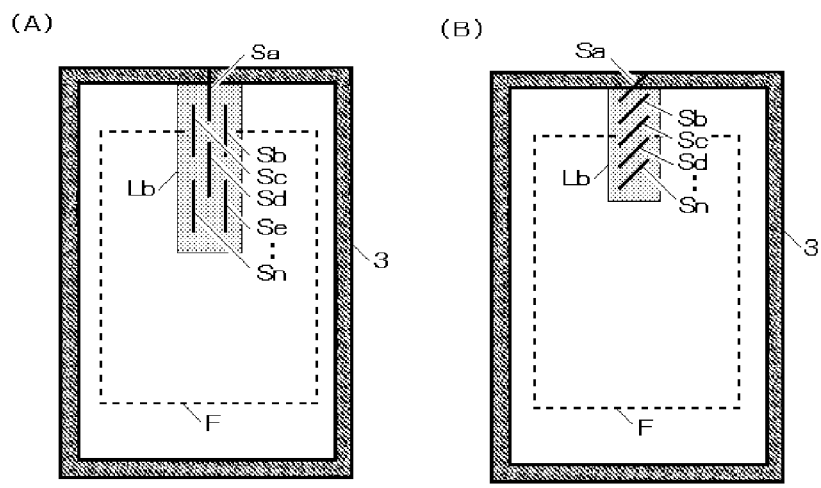
FIG. 7 is a schematic view illustrating a fourth construction example of a packaging container according to the present invention.

FIG. 7 is a schematic view illustrating a fourth construction example of the present container. In the present container, not only the first slit Sa but also one or more slits Sb, Sc, Sd, Se, . . . Sn continuously or intermittently connected to the first slit Sa are formed in the first internal layer 1a; each of the slits Sa to Sn is formed to have a shape of a straight line or a curved line or are formed intermittently in plural to be perpendicular to or to have a predetermined angle to the straight line or the curved line; and simultaneously, the second adhesive layer Lb is disposed in a region (second region) having a predetermined width of a neighborhood of the slits Sa to Sn. By disposing the plurality of slits Sa to Sn, the functions that can be applied to various structures and shapes deriving from the shape and property of the contents F (for example, being a liquid substance or need of a deoxygenation treatment) or a handling method are ensured.

Specifically, referring to FIG. 7(A), the plurality of slits Sb to Sn that are continuously or intermittently connected to the first slit Sa can enlarge the area of the second adhesive layer Lb that is in contact with the internal space 2, can promote melting of the second adhesive layer Lb and can perform an auxiliary function of prompting the opening by the first slit Sa by enlargement of the melted portion. Also, referring to FIG. 7(B), by setting the intersection angle by which the first slit Sa intersects the sealed part 3, the distance by which the first slit Sa intersects the sealed part 3 can be set, whereby the pressure in opening or the period of time until the opening can be adjusted. The plurality of slits Sb to Sn that are continuously or intermittently connected to the first slit Sa can enlarge the area of the second adhesive layer Lb that is in contact with the internal space 2, can promote melting of the second adhesive layer Lb and can perform an auxiliary function of prompting the opening by the first slit Sa by enlargement of the melted portion.

<Method for Manufacturing the Present Container>

Next, a basic process for producing the present container (hereafter referred to as "first manufacturing method") will be described in detail. The first manufacturing method comprises the following steps (1) to (6).

(1) step of supplying thin-layer films
(2) step of forming a slit
(3) step of forming a first adhesive layer
(4) step of forming a second adhesive layer
(5) step of producing a laminate film
(6) step of shaping the laminate film Also, the first manufacturing method further comprises the following steps (7a) and (8a).

(7a) step of forming a part of a sealed portion
(8a) step of introducing the contents and forming a seal of the packaging container Alternatively, the first manufacturing method further comprises the following steps (7b) and (8b).

(7b) step of introducing the contents into an internal space
(8b) step of forming a seal of the packaging container The details of the steps of the first manufacturing method will be described on the basis of a part of the manufacturing apparatus exemplified in FIG. 8.

(1) Step of Supplying Thin-Layer Films 1a to 1n

At least two or more thin-layer films 1a to 1n comprising a first inner layer film 1a and a second inner layer film 1b that is in contact with an outer side surface of the first inner layer film 1a are supplied respectively from source rolls (not illustrated in the drawings) of the films.

(2) Step of Forming a Slit

A plurality of slits comprising the first slit Sa are formed in the first inner layer film 1a by a slit producing unit 12. FIG. 8 shows a case in which the first slit Sa and slits (S) that are continuously connected to the first slit Sa are provided. By moving the slit producing unit 12, the slits may be intermittently provided on one and the same line, or alternatively, slits having a non-linear form (curved line form) can be formed as well. At this time, the slits comprising the first slit Sa are preferably formed continuously or intermittently in parallel to the direction of supplying the first inner layer film 1a from the roll in the aforesaid step (1) (step (2a)). The step of forming the slits can be carried out conveniently and rapidly, and a high processing precision can be ensured.

(3) Step of Forming a First Adhesive Layer La

Any one of the first adhesive agents described above is applied onto a first region (region other than the second adhesive layer Lb) between the first inner layer film 1a and the second inner layer film 1b, so as to form the first adhesive layer La. FIG. 8 exemplifies a case in which the first adhesive agent is applied onto the 1-surface of the second inner layer film 1b (that is, the surface bonded to the first inner layer film 1a); however, it is preferable that the application of the first adhesive agent onto the first region and the application of the second adhesive agent onto the second region are simultaneously carried out to form the first adhesive layer La and the second adhesive layer Lb simultaneously (step (3a)). The first adhesive agent can be applied together with the second adhesive agent onto either one of the first inner layer film 1a and the second inner layer film 1b. Alternatively, in a later-mentioned step (5), the first adhesive agent can be applied together with the second adhesive agent immediately before bonding the first inner layer film 1a and the second inner layer film 1b. The step of forming the adhesive layers can be carried out conveniently and rapidly, and a high processing precision can be ensured.

(4) Step of Forming a Second Adhesive Layer

A second adhesive agent, which has a lower melting temperature than the first adhesive agent, is applied onto a second region (excluding the first region) having a predetermined width and a predetermined length in a neighborhood of the slits comprising at least the first slit Sa, so as to form a second adhesive layer Lb. FIG. 8 exemplifies a case in which the second adhesive agent is applied onto the one side of the first inner layer film 1a (on the internal space 2 side); however, in the same manner as in the above step (3), the second adhesive agent can be applied together with the first adhesive agent onto either one of the first inner layer film 1a and the second inner layer film 1b. Alternatively, in a later-mentioned step (5), the second adhesive agent can be applied together with the first adhesive agent immediately before bonding the first inner layer film 1a and the second inner layer film 1b.

(5) Step of Producing a Laminate Film 1

Figure 8:
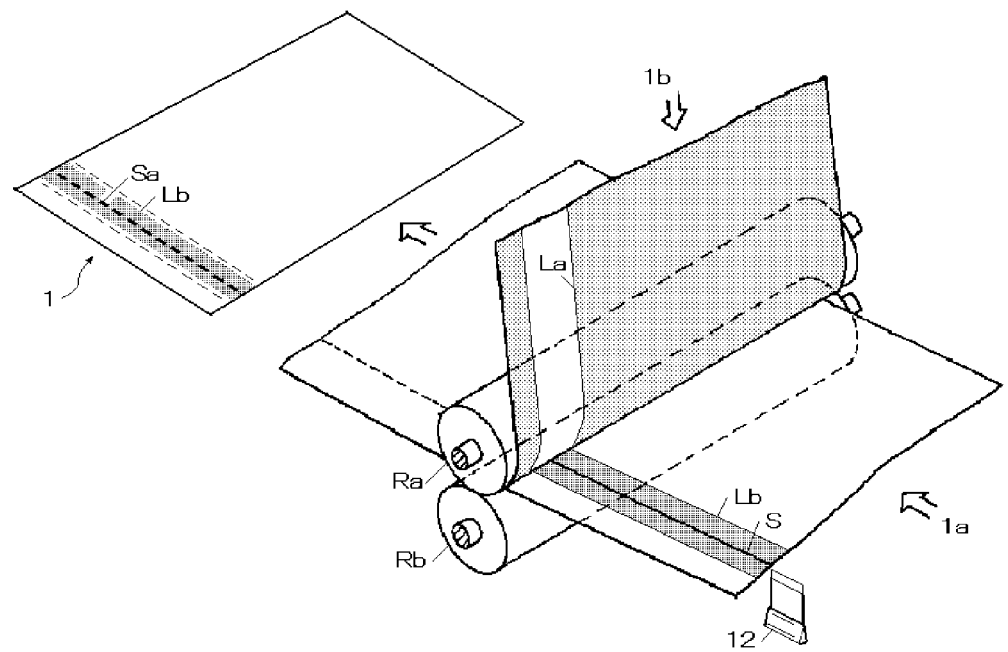
FIG. 8 is a schematic view exemplifying a part of an apparatus for manufacturing a laminate film according to the present invention.

Referring to FIG. 8, at least the first inner layer film 1a, the second inner layer film 1b, the first adhesive layer La, and the second adhesive layer Lb are bonded by rollers Ra and Rb and cut to a predetermined length to produce the laminate film 1. Further, in the case in which plural kinds of thin-layer films 1c, 1d, . . . 1n are laminated, the films are bonded by the first adhesive agent or adhesive agents suitable for the material quality or function of the films and are cut to a predetermined length to produce the laminate film 1.

In the case in which a part of the sealed part 3 is formed and the sealed part 3 is formed after introducing the contents F, it is preferable to apply a manufacturing method comprising the steps (7a), (8a) after passing through the following step (6).

(6) Step of Shaping the Laminate Film 1

Figure 9:
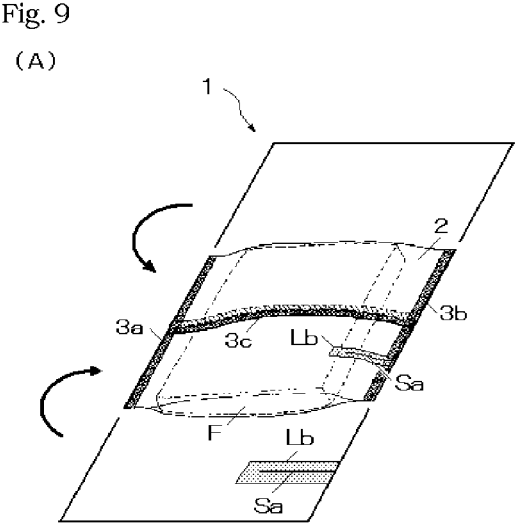
FIG. 9 is a schematic view exemplifying a part of a process for manufacturing a packaging container according to the present invention.
Figure 9:
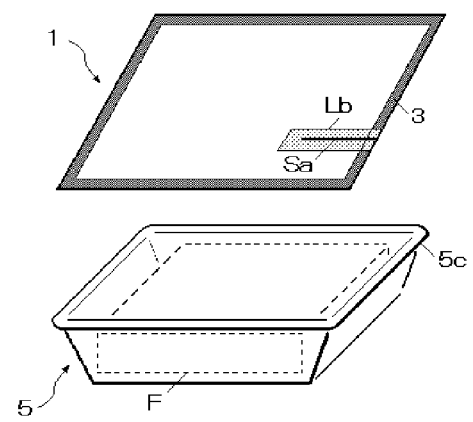

The laminate film 1 is shaped so that the laminate film 1 may have a predetermined shape constituting the packaging container. For example, according to the first construction example described above, the laminate film 1 is shaped so that the laminate film 1 may have a shape capable of forming sealed parts 3a to 3c at the time of completion and so that the first slit Sa may intersect a part of the sealed part 3b formed in the circumferential end part of the laminate film 1, as shown in FIG. 9(A). Also, according to the second construction example described above, the laminate film 1 is shaped so that the laminate film 1 may have a shape capable of forming a sealed part 3 in the flange part 5c of the container body 5 and so that the first slit Sa may intersect a part of the sealed part 3 formed in the circumferential end part of the laminate film 1, as shown in FIG. 9(B).

(7a) Step of Forming a Part of the Sealed Portion

A thermal fusion treatment is performed on the circumferential end part of the laminate film 1 so as to form an internal space 2 while leaving an inlet portion for introducing the contents F. For example, according to the first construction example described above, the sealed parts 3b and 3c at the time of completion are formed, and a part corresponding to the sealed part 3a capable of introducing the contents F is kept in an open state in FIG. 9(A). Also, according to the second construction example described above, the end side part of the laminate film 1 that the first slit Sa intersects is thermally fused to form a sealed portion, and the other end side parts (circumferential end parts of the laminate film 1) are kept in an open state so as to be capable of introducing the contents F in FIG. 9(B).

(8a) Step of Introducing the Contents F and Forming a Seal of the Packaging Container The contents F are introduced from the part kept in the open state into the internal space 2, and a thermal fusion treatment is performed on the part kept in the open state to form a seal of the packaging container.

In the case in which the sealed part 3 is formed through one step after introducing the contents F, it is preferable to apply a manufacturing method comprising the steps (7b), (8b) after passing through the following step (6).

(6) Step of Shaping the Laminate Film 1

The laminate film 1 is shaped so that the laminate film 1 may have a predetermined shape constituting the packaging container. For example, according to the first construction example described above, the laminate film 1 is shaped so that the laminate film 1 may have a shape capable of forming sealed parts 3a to 3c at the time of completion and so that the first slit Sa may intersect a part of the sealed part 3b formed in the circumferential end part of the laminate film 1, as shown in FIG. 9(A). Also, according to the second construction example described above, the laminate film 1 is shaped so that the laminate film 1 may have a shape capable of forming a sealed part 3 in the flange part 5c of the container body 5 and so that the first slit Sa may intersect a part of the sealed part 3 formed in the circumferential end part of the laminate film 1, as shown in FIG. 9(B).

(7b) Step of Introducing the Contents F into the Internal Space 2

The contents F are introduced into the internal space 2 formed by the laminate film 1. For example, according to the first construction example described above, the laminate film 1 is assembled so that the sealed parts 3a to 3c at the time of completion may be formed, whereby the internal space 2 is formed, and the contents F are introduced in FIG. 9(A). Also, according to the second construction example described above, the contents F are introduced into the container body 5 in FIG. 9(B).

(8b) Step of Forming a Seal of the Packaging Container

A thermal fusion treatment is performed on the circumferential end part of the laminate film 1 so as to form a seal of the packaging container. For example, according to the first construction example described above, the sealed parts 3a to 3c are formed so that the internal space 2 into which the contents F are introduced may be formed in FIG. 9(A). Also, according to the second construction example described above, the whole end side parts of the laminate film 1 are thermally fused to form a sealed portion in FIG. 9(B).

By simple steps such as described above, a packaging container having excellent functions of preventing leakage of the stored contents with certainty and preventing breakage of the packaging container or flying-out of the contents accompanying the pressure rise in the inside of the container accompanying the warming can be manufactured without passing through complicated steps. At this time, the seal can be formed either before or after introducing the contents into the internal space depending on the property or the like of the contents. By introducing the contents into the internal space after a part of the seal is formed in advance, a treatment of reducing the pressure in the internal space can be easily carried out. By forming the seal after the contents are introduced into the internal space, the seal can be formed by an integral thermal fusion treatment.

Also, in the above manufacturing steps, there are cases in which it is preferable that an inert gas or a gas predetermined by the contents (enclosed gas) is tightly sealed in the inside of the container together with the contents under pressurized conditions. In other words, as described above, in a case in which the contents comprise fresh foods or the like, the freshness thereof can be maintained by enclosing an inert gas. In a case in which the contents comprise porridge or a fruit, the flavor thereof can be maintained or increased by enclosing oxygen, ethylene, or the like. Specifically, (i) in the case of a packaging container in which the contents are introduced after a part of the seal is formed, and thereafter the seal is completed, a firm sealing property of the enclosed gas is ensured by comprising, instead of the step (8a), the steps of:

(8c) introducing the contents into the internal space of the packaging container and tightly sealing the enclosed gas under pressurized conditions; and (8d) performing a thermal fusion treatment on the inlet portion of the contents (and the enclosed gas) to form a seal of the packaging container, and (ii) in the case of a packaging container in which the seal is formed after the contents are introduced, a firm sealing property of the enclosed gas is ensured by comprising, instead of the step (8b), the steps of:

(8e) tightly sealing the enclosed gas under pressurized conditions; and (8f) forming a seal of the packaging container by performing a thermal fusion treatment on the circumferential end part of the laminate film.

(Second Method for Manufacturing the Present Container)

The method for manufacturing the present container can comprise the following steps (2b) to (5b) instead of the above steps (2) to (5).

(2b) step of forming a first adhesive layer La in the same manner as in the above step (3)

(3b) step of forming a second adhesive layer Lb in the same manner as in the above step (4)

(4b) step of producing a laminate film 1 in the same manner as in the above step (5)

(5b) step of forming a slit in the first inner layer film 1*a*

One or more slits comprising the first slit Sa are formed by laser processing in the first inner layer film 1*a*. By using a laser processing technique, capable of precise processing, after completion of the laminate film 1 or immediately before completion of the packaging container without forming the slits in advance in the first inner layer film 1*a*, slits that accord to a desired slit shape or slit width can be formed with a good precision. Thereafter, by performing the above steps (6) to (8), a packaging container having excellent functions of preventing leakage of the stored contents with certainty and preventing breakage of the packaging container or flying-out of the contents accompanying the pressure rise in the inside of the container accompanying the warming can be manufactured by simple steps without passing through complicated steps.

The invention claimed is:

1. A packaging container having a laminate film formed by laminating a plurality of thin-layer films, so as to form an internal space for storing contents, in which at least a part of a circumferential end part of the laminate film is subjected to a thermal fusion treatment to form a sealed portion, wherein
the laminate film is formed of at least two or more thin-layer films comprising a first inner layer that is in contact with the internal space and a second inner layer that is in contact with an outer side surface of the first inner layer, and has a first adhesive layer having a first adhesive agent applied thereon and disposed between the first inner layer and the second inner layer;
a first slit having a predetermined length is formed in the first inner layer so as to intersect a part of a fused portion of the circumferential end part subjected to the thermal fusion treatment, and a second adhesive layer having a second adhesive agent, which has a lower melting temperature than the first adhesive agent, applied thereon instead of the first adhesive agent is disposed in a region having a predetermined width in a neighborhood of the first slit; and,
in a state in which the internal space is subjected to warming and an internal pressure thereof is raised, the second adhesive layer is melted by the warming and/or by a warmed vapor to generate a space part between the first inner layer and the second inner layer in the neighborhood of the first slit and to form an opening by the first slit
wherein a first outer circumferential portion having the second adhesive layer is formed at a site located on a further outer circumferential side of the fused portion of the circumferential end part and on an outer circumferential side of one end of the first slit and, in a state in which the internal space is subjected to warming and an internal pressure thereof is raised, the second adhesive layer in the neighborhood of the first slit is melted by the warming and/or by a warmed vapor to generate a space part between the first inner layer and the second inner layer so as to form an opening in the first slit and in the first outer circumferential portion, and the laminate film can be peeled off from the opening formed in the first slit and in the first outer circumferential portion, whereby the contents can be taken out from the internal space.

2. The packaging container according to claim 1, wherein a part of the plurality of thin-layer films comprises a non-gas-permeable film, and an inert gas or a gas predetermined by the contents is tightly sealed in the internal space together with the contents under pressurized conditions.

3. The packaging container according to claim 2, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form a seal in the packaging container so as to form the internal space.

4. The packaging container according to claim 3, wherein one or more slits continuously or intermittently connected to the first slit are formed in the first internal layer; each of the slits is formed to have a shape of a straight line or a curved line or are formed intermittently in plural to be perpendicular to or to have a predetermined angle to the straight line or the curved line; and the second adhesive layer is disposed in a region having a predetermined width of a neighborhood of the slits.

5. The packaging container according to claim 2, wherein one or more slits continuously or intermittently connected to the first slit are formed in the first internal layer; each of the slits is formed to have a shape of a straight line or a curved line or are formed intermittently in plural to be perpendicular to or to have a predetermined angle to the straight line or the curved line; and the second adhesive layer is disposed in a region having a predetermined width of a neighborhood of the slits.

6. The packaging container according to claim 1, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form a seal in the packaging container so as to form the internal space.

7. The packaging container according to claim 6, wherein one or more slits continuously or intermittently connected to the first slit are formed in the first internal layer; each of the slits is formed to have a shape of a straight line or a curved line or are formed intermittently in plural to be perpendicular to or to have a predetermined angle to the straight line or the curved line; and the second adhesive layer is disposed in a region having a predetermined width of a neighborhood of the slits.

8. The packaging container according to claim 1, wherein one or more slits continuously or intermittently connected to the first slit are formed in the first internal layer; each of the slits is formed to have a shape of a straight line or a curved line or are formed intermittently in plural to be perpendicular to or to have a predetermined angle to the straight line or the curved line; and the second adhesive layer is disposed in a region having a predetermined width of a neighborhood of the slits.

9. A method for manufacturing a packaging container having a laminate film formed by laminating a plurality of thin-layer films, so as to form an internal space for storing contents, in which at least a part of a circumferential end part of the laminate film is subjected to a thermal fusion treatment to form a sealed portion, comprising the steps of:
(1) supplying at least two or more thin-layer films comprising a first inner layer film that is in contact with the internal space and a second inner layer film that is in contact with an outer side surface of the first inner layer film respectively from source rolls of the films;
(2) forming one or more slits, which comprise a first slit and are continuously or intermittently connected to the first slit, in the first inner layer film;
(3) applying a first adhesive agent, which maintains an adhesive property under temperature and pressure conditions at using the packaging container, to a first region between the first inner layer film and the second inner layer film, so as to form a first adhesive layer;

(4) applying a second adhesive agent, which has a lower melting temperature than the first adhesive agent, to a second region having a predetermined width and a predetermined length, excluding the first region, in a neighborhood of the slits comprising at least the first slit, so as to form a second adhesive layer;

(5) bonding at least the first inner layer film, the second inner layer film, the first adhesive layer, and the second adhesive layer, so as to produce the laminate film;

(6) shaping the laminate film in order that the laminate film has a predetermined shape constituting the packaging container and in order that the first slit intersects a part of a fused portion formed in the circumferential end part of the laminate film, and further comprising the steps of:

(7a) forming a sealed portion by performing a thermal fusion treatment on the circumferential end part of the laminate film so as to form the internal space while leaving an inlet portion for introducing the contents; and (8a) introducing the contents from the inlet portion into the internal space and performing a thermal fusion treatment on the inlet portion to form a seal of the packaging container, and forming a first outer circumferential portion having the second adhesive layer at a site located on a further outer circumferential side of the fused portion of the circumferential end part and on an outer circumferential side of one end of the first slit, or alternatively further comprising the steps of:

(7b) introducing the contents into the internal space formed by the laminate film; and (8b) forming a seal of the packaging container by performing a thermal fusion treatment on the circumferential end part of the laminate film, and forming a first outer circumferential portion having the second adhesive layer at a site located on a further outer circumferential side of the fused portion of the circumferential end part and on an outer circumferential side of one end of the first slit.

10. The method for manufacturing the packaging container according to claim 9, comprising, instead of the step (8a), the steps of:

(8c) introducing the contents from the inlet portion into the internal space and tightly sealing an inert gas or a gas predetermined by the contents under pressurized conditions; and (8d) performing a thermal fusion treatment on the inlet portion to form a seal of the packaging container, and forming a first outer circumferential portion having the second adhesive layer at a site located on a further outer circumferential side of the fused portion of the circumferential end part and on an outer circumferential side of one end of the first slit, or alternatively comprising, instead of the step (8b), the steps of:

(8e) tightly sealing an inert gas or a gas predetermined by the contents under pressurized conditions; and (8f) forming a seal of the packaging container by performing a thermal fusion treatment on the circumferential end part of the laminate film, and forming a first outer circumferential portion having the second adhesive layer at a site located on a further outer circumferential side of the fused portion of the circumferential end part and on an outer circumferential side of one end of the first slit.

11. The method for manufacturing the packaging container according to claim 10, comprising, instead of the steps (2) to (4), the steps of:

(2a) continuously or intermittently forming the slits comprising the first slit parallel to a direction of supplying the first inner layer film from the source roll; and (3a) simultaneously performing application of the first adhesive agent to the first region and application of the second adhesive agent to the second region so as to form the first adhesive layer and the second adhesive layer simultaneously.

12. The method for manufacturing the packaging container according to claim 10, comprising, instead of the steps (2) to (5), the steps of:

(2b) forming the first adhesive layer in the same manner as in the step (3);

(3b) forming the second adhesive layer in the same manner as in the step (4);

(4b) forming the laminate film in the same manner as in the step (5);

(5b) forming one or more slits, which comprise the first slit and are continuously or intermittently connected to the first slit, by performing laser processing on the first inner layer film on which the second adhesive layer has been formed.

13. The method for manufacturing the packaging container according to claim 10, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form the sealed portion in the step (7a) and the seal in the step (8a) or (8d), or alternatively the seal in the step (8b) or (8f).

14. The method for manufacturing the packaging container according to claim 9, comprising, instead of the steps (2) to (4), the steps of:

(2a) continuously or intermittently forming the slits comprising the first slit parallel to a direction of supplying the first inner layer film from the source roll; and (3a) simultaneously performing application of the first adhesive agent to the first region and application of the second adhesive agent to the second region so as to form the first adhesive layer and the second adhesive layer simultaneously.

15. The method for manufacturing the packaging container according to claim 14, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form the sealed portion in the step (7a) and the seal in the step (8a) or (8d), or alternatively the seal in the step (8b) or (8f).

16. The method for manufacturing the packaging container according to claim 9, comprising, instead of the steps (2) to (5), the steps of:

(2b) forming the first adhesive layer in the same manner as in the step (3);

(3b) forming the second adhesive layer in the same manner as in the step (4);

(4b) forming the laminate film in the same manner as in the step (5);

(5b) forming one or more slits, which comprise the first slit and are continuously or intermittently connected to the first slit, by performing laser processing on the first inner layer film on which the second adhesive layer has been formed.

17. The method for manufacturing the packaging container according to claim 9, wherein the packaging container has a container body having a recess that is shaped to be capable of storing the contents, a planar opening part that is shaped at one end plane, and a flange part having a predetermined width that is formed on an outer circumference of the opening part, and has the laminate film; and the circumferential end part of the laminate film is thermally fused to the flange part to form the sealed portion in the step (7a) and the seal in the step (8a) or (8d), or alternatively the seal in the step (8b) or (8f).

* * * * *